United States Patent [19]

Molva et al.

[11] Patent Number: 5,347,580
[45] Date of Patent: Sep. 13, 1994

[54] AUTHENTICATION METHOD AND SYSTEM WITH A SMARTCARD

[75] Inventors: Refik Molva, Juan-Les-Pins; Gene Tsudik, Thalwil, both of European Pat. Off.

[73] Assignee: International Business Machines Corporation, Armonk, N.Y.

[21] Appl. No.: 34,023

[22] Filed: Jun. 1, 1993

[30] Foreign Application Priority Data

Apr. 23, 1992 [EP] European Pat. Off. ......... 92810294.6

[51] Int. Cl.$^5$ .............................................. H04L 9/32
[52] U.S. Cl. ......................................... 380/25; 380/21; 380/23; 380/29; 380/30; 380/49; 235/379; 235/380; 340/825.31; 340/825.34
[58] Field of Search ................. 380/9, 21, 23, 24, 25, 380/30, 43, 49, 50, 29; 235/379, 380; 340/825.31, 825.34

[56] References Cited

U.S. PATENT DOCUMENTS

| | | | |
|---|---|---|---|
| 4,679,236 | 7/1987 | Davies | 380/23 |
| 4,799,061 | 1/1989 | Abraham et al. | 340/825.34 |
| 4,961,224 | 10/1990 | Yung | 380/25 |
| 5,208,858 | 5/1993 | Vollert et al. | 380/43 |
| 5,237,614 | 8/1993 | Weiss | 380/23 |

FOREIGN PATENT DOCUMENTS

| | | | |
|---|---|---|---|
| 0140013 | 8/1985 | European Pat. Off. | G07F 7/10 |
| 0234100 | 2/1987 | European Pat. Off. | G07F 7/10 |
| 8703977 | 2/1987 | World Int. Prop. O. | G06F 7/10 |

OTHER PUBLICATIONS

Abstract of Research Report RX 2315 entitled "Secure and Inexpensive Authentication with Minimalist Smartcards", authored by R. Molva and G. Tsudik, in IBM Zurich Research Reports 2Q/1992 (first published after Jun. 1, 1992).

IBM Technical Disclosure Bulletin, dated Jan. 1985, vol. 27, No. 8, p. 4710, entitled "Smart Card Protection by the use of Dynamic Signature Verification One-Way Codes", authored by T. K. Worthington.

IBM Technical Disclosure Bulletin, dated Aug. 1985, vol. 28, No. 3, pp. 1130–1132, entitled "Acquirer Personal Verification in a Point-Of-Sale System".

Article entitled "Authentication and Delegation with Smart-Cards", authored by M. Abadi, et al, in DEC SRC Technical Report 67, Oct. 1990, pp. 1–24.

Article entitled "Using Encryption for Authentication in Large Networks of Computers", authored by R. Needham and M. Schroeder, appeared in the Communications of the ACM, Dec. 1978, vol. 21, No. 12, pp. 993–999.

Article entitled "Cryptographic Identification Methods for Smart Cards in Process of Standardization", authored by H. Konigs, appeared in the IEEE Communications Magazine, Jun. 1991, pp. 42–48.

An article entitled "Smart-Cards for Network Services", authored by Ernst Piller, appeared in Information Processing 86–Proceedings of the IFIP 10th World Computer Congress, Dublin, Ireland, Sep. 1–5, 986, H. J. Kugler (ed.), Elsevier Science Publishers B. V. (North Holland), pp. 963–968.

An article entitled "The Smart Card: A high security tool in EDP", authored by R. C. Ferreira, appeared in Philips Telecommunication and Data Systems Review, vol. 47, No. 3, Sep. 1989, Hilversum NL, pp. 1–19.

*Primary Examiner*—Bernarr E. Gregory
*Attorney, Agent, or Firm*—A. P. Tennent

[57] ABSTRACT

This invention relates to a novel smartcard-based authentication technique using a smartcard that encrypts the time displayed on the card with a secret, cryptographically strong key. The (public) work station receives as input certain values defining the user, the card and a particular value derived from the encrypted time and encrypts and/or transmits these values to the server. The server, in turn, computes from received values some potential values and compares these to other received values. If the server determines a match, an accept signal is transmitted to the work station.

21 Claims, 3 Drawing Sheets

FIG. 4

| Nc: | 9 4 5 2 5 2 | 0 7 1 4 3 7 5 5 4 6 1 0 0 1 |
|---|---|---|

PIN: 2 6 7 1 9 0

| INDEX: | 0 1 2 3 4 5 6 7 8 9 | 0 1 2 3 4 5 6 7 8 9 |
|---|---|---|
| Nc: | 9 4 5 2 5 2 0 7 1 4 | 3 7 5 5 4 6 1 0 0 1 |

PIN: 2 6 7 1 9 0

Ku: 5 0 7 4 4 9  3 7 5 5  4 6 1 0 0 1
    _____/  _____/
         C                  D

AUTHENTICATION METHOD AND SYSTEM WITH A SMARTCARD

BACKGROUND OF THE INVENTION

Field of the Invention

Broadly speaking, this invention relates to an authorization or authentication method in an environment where persons access a computerized system via remote terminals, e.g. in a banking system or in a data base system with restricted access. In many cases, personal identification numbers (PINs) and smartcards, i.e. devices containing a limited processing capability, are used in such computerized applications to help or enable authenticating a human user who has to identify himself/herself to the system.

More particularly, this invention relates to a novel smartcard-based authentication technique using a smartcard that encrypts a running value, e.g. the time, displayed on the card with a secret, cryptographically strong key. A (public) work station and a server compute, transmit and/or encrypt various values to provide a secure channel between the human user and the server.

Description of Related Art

User Authentication and Related Exposures

In order to obtain access rights to system resources, a human user needs to prove his identity or authenticate himself to the entities that permit access control on protected resources. In a distributed system environment, the resources are usually remotely located with respect to the user; thus, the authentication of the user to the access control agent requires the exchange of messages that constitute the user authentication protocol. The authentication protocol helps the user to prove his identity to the authentication server (AS) by demonstrating his knowledge of a secret (e.g. a password or PIN) that is shared with the AS.

User authentication protocols suffer from an inherent exposure to masquerading by malicious intruders. An intruder can spoof, intercept and replay the authentication messages. In cases where a secret is sent in clear text (as in most traditional log-in procedures) simple spoofing and replay is sufficient to break the protocol. More recent protocols, as disclosed e.g. by R. Needham and M. Schroeder in "Using Encryption for Authentication in Large Networks of Computers", Communications of the ACM, December 1978, (hereinafter "Needham et al."), use the user's secret as an encryption key or as a seed from which an encryption key is derived.

However, this measure is only partly useful because, as described in T. Lomas, L. Gong, J. Saltzer and R. Needham in "Reducing Risks from Poorly Chosen Keys", Proceedings of ACM Symposium on Operating System Principles, 1989, such an encryption key is weak and can be easily broken by wiretappers. This weakness is due to the lack of randomness in the way human users choose their secrets and to the human beings' difficulty of remembering perfectly random numbers. In other words, the user's secret is chosen out of a space that is relatively small in comparison with the minimum key space required by a good cryptographic algorithm. Typically, the secret is a password chosen from a dictionary the size of which (on the order of $10^5$) is by several orders of magnitude smaller than, for example, the one ($2^{56}$) required by the Data Encryption Standard DES (National Bureau of Standards: "Federal Information Processing Standards, Publication 46", 1977). The cryptographic keys derived from such weak secrets can be easily broken by brute force attacks with an exhaustive search in the relatively small key space from which the secret is chosen.

A practical mechanism for recovering strong cryptographic keys using weak secrets without exposure is provided by smartcards as shown by M. Abadi, M. Burrows, C. Kaufman, and B. Lampson, "Authentication and Delegation with Smartcards", DEC SRC Technical Report 67, October 1990, (hereinafter "Abadi, et al.") and by H. Konigs, "Cryptographic Identification Methods for Smart Cards in the Process of Standardization" IEEE Communications Magazine June 1991.

Authentication with Smart Cards

A smartcard is a device with processing capability that contains a cryptographic key. One purpose is to aid user authentication in a hostile environment. Unlike the weak keys (passwords and PINs) used by human beings, the smartcard's key may be randomly chosen out of the total key space of the cryptographic algorithm in use. The probability of success with a brute force attack based on exhaustive search in the key space is therefore negligible. The user must activate the smartcard operation by authenticating himself using a weak initial secret but this interaction takes place directly between the user and the card (via a card's key-pad or a protected card reader device) without any involvement of untrusted media. Thereafter, all data exchanged over the untrusted network is sent under the protection afforded by encryption using the smartcard's strong secret. Since the card is a simple device (not unlike a calculator), it is trusted by the principals involved.

Basic Considerations

In this section, the physical characteristics of the smartcard design will be addressed in general. The following features influence both the cost and the security of the smartcard protocols and the smartcard itself.

Physical Connection: this is the physical (electric) coupling that allows the card to communicate directly with the work station without involvement of the user in transfers of information between the card and the work station. Also, with a galvanic connection, a card needs no power supply (battery) of its own since the work station can provide it. Unfortunately, the cost of equipping every work station with a secure card reader (and every card with a receptor) can be prohibitively high, especially in a cost-conscious environment.

Interaction Complexity: a relevant factor is the volume of information that a user must exchange with the card. A galvanic connection eases the problem since the interface between the card and the work station allows for fast information transfer without human involvement. Alternatively, when no galvanic connection exists, the user must act as an intermediary between the card and the work station. To provide increased ease of use, the goal is to skew the tradeoff towards increased functional complexity for minimal interaction complexity. In this respect, an ideal protocol with no galvanic connection would require the input of one bit on the card (e.g., an on/off button and no key-pad) and the reading of a number by the user.

Key-pad: a key-pad may be needed to enter into the card the user's secret like a password or a PIN. If a card is not equipped with a galvanic connection, other information may need to be entered via a card's key-pad (i.e. in this case, the user acts as a conduit between the work station and the card).

Clock: a clock may be required for generating timeliness indicators and, possibly, nonces as shown in the Needham et al. article. However, a clock requires a battery which has to be replaced or recharged periodically. In the Abadi et al. article, the authors suggest that "having a clock is particularly difficult because it requires a battery". While a battery is indeed required, having a clock does not have to present difficulties. Nowadays, many personal electronic gadgets operate on dry cell batteries without any significant penalty in cost or performance. Wristwatches, pocket calculators and hearing aides are the most widespread of these. Such devices can either require a change of battery every 2-3 years, or be disposable.

Display: a display is imperative when there is no electric coupling between a smartcard and a work station. With a galvanic connection, however, a work station's display may be utilized as described in the Abadi et al. article.

Non-volatile Storage: stable, non-volatile read-only storage is needed to store the card's secrets, e.g., a key or a nonce generator seed. It may also be needed to store public key(s) of the certification authority or the AS. Some designs may also require a non-volatile RAM to store secrets or sequence numbers generated at run-time. The drawback of maintaining a non-volatile RAM is the amount of power needed to refresh the memory that is relatively high in comparison with the power required by a clock.

Volatile Storage: temporary, volatile storage is necessary to store certificates, session keys, etc., for the duration of an authentication session. It is, of course, desirable to minimize the size of volatile storage.

Encryption/Decryption Ability: the complexity of the encryption algorithm influences the cost and the performance of the card. One possibility is to confine the card's ability to a secret one-way function only. This simplifies the implementation.

In the following section, the main issues involved with the design of smartcard protocols are analyzed.

Protocol Scenarios

A smartcard protocol can perform either peer-to-peer or server-based authentication.

In the peer-to-peer case, the protocol achieves the authentication of a user to remote entities that control the access to target resources. The smartcard and the user must therefore possess a pair-wise authentication capability with respect to every remote program which the user may need to access. The pair-wise authentication capability can be implemented by a shared secret key with conventional cryptography (DES) and by the private key of the user with a public-key scheme.

In the server-based case, the remote program is an AS that provides the user's local programs with a pair-wise authentication capability which is subsequently used in peer-to-peer authentication. A more sophisticated server-based protocol can be designed to perform a two-stage authentication a la Kerberos, as disclosed by J. Steiner in "The Kerberos Network Authentication Service Overview", MIT Project Athena RFC, Draft 1, April 1989, whereby the initial phase of the protocol is dedicated to the authentication of the human user and to the delegation of his rights to the local programs and the subsequent phases to the server-based authentication of the user's programs accessing remote programs. The initial phase of this protocol always involves the smartcard and an AS whereas the server-based authentication between the user's programs and the remote ones may not require smartcard interaction and use the credentials delegated during the first phase.

Conversely, the protocols may also vary depending on the smartcard's involvement in the authentication process. In one extreme, the smartcard may keep the total control of all the authentication exchanges between the local and remote programs whereas in the other extreme the smartcard's involvement may be kept at a minimum by its utilization in the authentication of the user and in the delegation of the user's rights to local programs only.

Symmetrical versus Asymmetrical Cryptography: many existing smartcard schemes employ asymmetrical (public key) cryptography. This has the main drawback that public key encryption remains quite expensive in terms of both implementation and performance. On the other hand, smartcard techniques employing conventional symmetrical encryption suffer from heavy administrative burden owing to the need to maintain a per card record at the AS in addition to user records containing passwords.

Further to the literature cited above, the following publications are related.

W. Diffie and M. Hellman, "New Directions in Cryptography", IEEE Transactions on Information Theory, November 1976.

R. Rivest, "The MD4 Message Digest Algorithm", Proceedings of CRYPTO'90, August, 1990.

R. Rivest, A. Shamir and L. Adleman, "A Method for Obtaining Digital Signatures and Public Key Cryptosystems", Communications of the ACM, February 1978.

As described above and apparent from the references, there are various systems available that use smartcards. Existing smartcard designs as described e.g. the Abadi et al. article, use a delegation technique whereby the card acts on behalf of the user by deploying its strong cryptographic capability. Nonetheless, before the card can run any protocol on behalf of the user, the latter has to authenticate himself to the card.

Some early smartcard designs did not involve any such authentication; mere possession of the "personalized" card identified the user. Other, more recent designs require some interaction between the user and his smartcard. The main disadvantage of the delegation scheme is the need for a fixed relationship between the smartcard and the user. The drawback of such a relationship is twofold.

First, there is a requirement for the card's capability to authenticate the user: the smartcard must contain the user's secret in order to authenticate the user. This requirement implies the need to define the user secrets (password or PIN) at the time where these secrets are stored in the card, e.g. when the card is manufactured or when the card's memory is programmed. This reduces the user's ability to change his secrets with the ability to update the card's storage.

Second, there is an administrative burden of maintaining the card-user relationship: since the card is acting on behalf of the user with respect to external parties, the relationship between the card and the user must be corroborated and protected by the administration so that all transactions performed by a card can be accounted as performed by the associated human user. In order to maintain such a relationship the administration that delivers cards must assure a safe distribution, update and revocation of the smartcards.

The disadvantages of the existing smartcard designs that are due to the fixed card-user relationship are overcome by the novel technique presented here. The smartcard according to this invention is not personalized. It is used only as a mechanism to obtain a secure channel between the user and the remote authenticating party. According to the invention, the smartcard's identity is not associated with any user. Consequently, with this new concept, the registration of the user's secret in the smartcard, the safe distribution of cards to users and the protection of smartcards by the users are not needed and smartcards can even be shared by several users without causing any exposure.

SUMMARY OF THE INVENTION

The present invention is a new smartcard-based authentication protocol. One main feature of this protocol is that security of the smartcard and the human user are not tied together. This property is obtained by using the smartcard not as a representative of the user's identity but only as a means to provide a cryptographically secure channel between the user and the remote authentication station. These goals lead to a design of a new authentication protocol with the following advantages.

The protocol is suitable for existing computing environments consisting of simple work stations with no special security device like protected smartcard readers.

The protocol requirements are minimal by avoiding public key cryptography and expensive card features.

The protocol is secure against possible attacks.

The smartcard is not personalized, i.e., it is not associated with a particular user. This property implies several advantages. First, there is no administration cost; the smartcard does not need to be registered under a user's name or sent to a particular user with safe courier. Smartcards can be freely purchased over the counter with no special registration procedure and subsequently shared or exchanged. Second, potential masquerading is prevented; since a smartcard, by itself, does not represent any user, its theft carries no danger. In other words, a stolen smartcard can not be misused in any way to obtain the rights of any of its past or future users. Third, there is no PIN storage on the card; the user's secret does not need to be stored on the card. This eliminates the need for entering, updating and storing user specific secrets, e.g. passwords, PINs, biometric patterns, on the smartcard. This feature leads to a low-cost design.

The smartcard's secret key is not stored in the AS. This property offers the advantage of a minimum key management requirement. The AS has to keep only one key to be able to retrieve all the smartcard keys. The management of the smartcard keys has therefore a minimal complexity. The key storage in the AS is independent of the existing card population; addition, update, revocation of smartcards and/or their keys have no effect on the AS.

The smartcard protocol described above achieves the above mentioned goals with minimum requirements for smartcard and protocol features. No hardware modifications to existing terminal or work station equipment seems necessary, i.e. no card readers or physical coupling on the work station, if so desired. Also, the design does not rely on public key cryptography or other sophisticated encryption algorithms that impose significant execution overhead. Further, only a secret one-way function is required, e.g. DES encryption. Finally, the authentication protocol achieves, if desired, more than the traditional user-to-AS authentication. It may also provide for a kind of symmetric AS-to-user authentication which can be obtained at the discretion of the user at minimal cost by a visual comparison of two numbers.

To summarize, the invention is a method and a system for authenticating a user with a smartcard, said system including an authentication server and a plurality of distributed work stations or terminals connected to the server. The smartcard has a card identifier, a running value device (e.g. a clock), input and/or output means, and encrypting means with a secret card key for encrypting the smartcard, the user names, user PINs, one or more secret keys and, preferably, card identifiers. In brief, the following method is performed.

a. The smartcard indicates the card running value and computes a card encryption of this indicated running value under its secret card key, b. the work station receives the user name, the card identifier, the card running value, and a user authenticator computed from the user's personal identifier and the card encryption, c. the work station transmits to the server the user name, the card running value, the card identifier, and an encryption of the card running value under the user authenticator, d1. the server determines a potential secret card key from the received card identifier and a potential personal identifier from the received user name, d2. the server now computes a potential encryption of the received running value under the potential secret card key, and, combining the potential personal identifier and the computed encryption, obtains a potential user authenticator, d3. the server then computes a potential encryption of the received card running value under the potential user authenticator and compares this value to the received encryption value of the card running value under the user's authenticator, e. if a match of the potential encryption value with the received encryption value is determined, the server transmits an accept signal to the work station concerned.

Details are disclosed in the following description of a preferred embodiment of a method and a system according to the invention in connection with the appended drawings.

BRIEF DESCRIPTION OF THE DRAWINGS

FIG. 4 depicts a first method of composing a user authenticator.

FIG. 5 depicts a second method of composing a user authenticator.

DESCRIPTION

Figure 1:
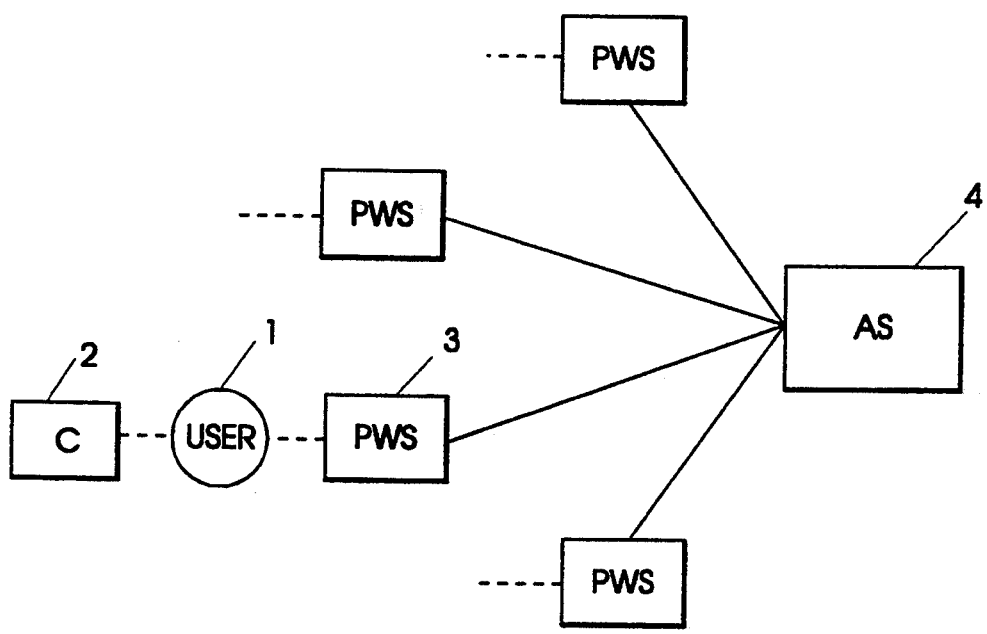
FIG. 1 depicts a basic scheme for a system implementing the invention.

FIG. 1 shows a very general scheme for an implementation of the invention. A user 1 with his/her smartcard 2 enters a system that includes a number of public work stations 3 connected to an authentication server or AS 4 via one of said work stations 3.

Figure 2:
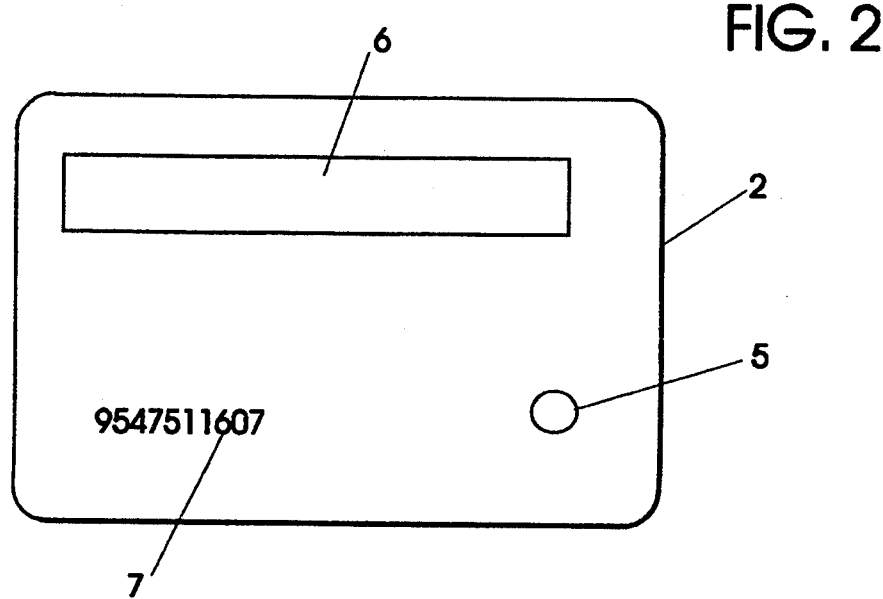
FIG. 2 shows a smartcard with an internal clock as used with the invention.

An example for a smartcard 2 is shown in FIG. 2, which depicts a card with a built-in internal clock. The following smartcard features are significant.

No card-user relationship: smartcard 2 is completely decoupled from the user. It has no PIN or password checking capabilities and acts only as a means for providing a secure channel between the user and the AS. A card can be purchased over the counter in a retail shop. There is no buyer registration required and users are free to resell, exchange, discard or lend the card to anyone.

No key-pad: since the user enters no data into smartcard 2, it has no key-pad but only a button 5, a sequence button, to control the sequencing of subsequent displays (see below) by the card within a single authentication session.

No galvanic connection: smartcard 2 has no galvanic connection. No card reader is thus required.

Display: smartcard 2 has a display 6, preferably an LCD display.

Clock: smartcard 2 has a built-in clock. The clock does not necessarily have a dedicated display. The running value is displayed (and the display is active) only when the card is on. The clock does not need to be particularly precise; second precision is sufficient for reasons explained below.

Cryptographic capability: smartcard 2 implements a one-way function, e.g. a DES encryption with a secret key. However, if a encryption-decryption algorithm is used as a one-way function, smartcard 2 does not need to incorporate the entire algorithm, encryption alone is sufficient.

Smartcard's secret: every smartcard 2 possesses a secret, $Kc$, which is computed as $Kc=E(Kas, SNc)$, where $SNc$ is the unique serial number 7 of smartcard 2 and $Kas$ is a card key generation key, a secret key known only to the AS. At the time of manufacture, each card is assigned a unique $SNc$ and a corresponding $Kc$. While $Kc$ is a secret value, $SNc$ is not. For example, $SNc$ may be etched onto every card, not unlike other serial numbers on other electronic merchandise, as shown in FIG. 2. Even the means for generation of $SNc$'s is not necessarily kept secret; it may simply be a monotonous increasing 32-bit (ten-digit) number.

Every legitimate user is identified by a combination of, first, a unique user (or log-in) name and, second, a password or a PIN. A password may be an alphanumeric string of, say, eight characters, while a PIN is generally a numeric string (i.e., a decimal number) of at most five-six digits in length. For clarity's sake, the term PIN is used hereafter to mean both password and PIN in their traditional sense.

Every AS 4 is responsible for keeping the records of its constituent users. A user's record includes, among other things, the name and the PIN of the user. For further refinement, the AS 4 may know only a one-way function of the PIN similar to the way some modern operating systems store only a one-way function of the users' passwords. However, for simplicity's sake, it is assumed that the PIN itself is stored by the AS 4. The only information that AS 4 has to know about all smartcards is the card key generation key, $Kas$. AS 4 does not keep track of the identities or secrets of individual smartcards.

The goals of the method here implemented are twofold. First, the method must provide mutual authentication of the AS and the user. (Workstation authentication is not taken into account here, but a basic protocol can be easily extended to provide it.) Second, the method must provide for delegation of the user's identity to the work station for a limited duration.

Figure 3:
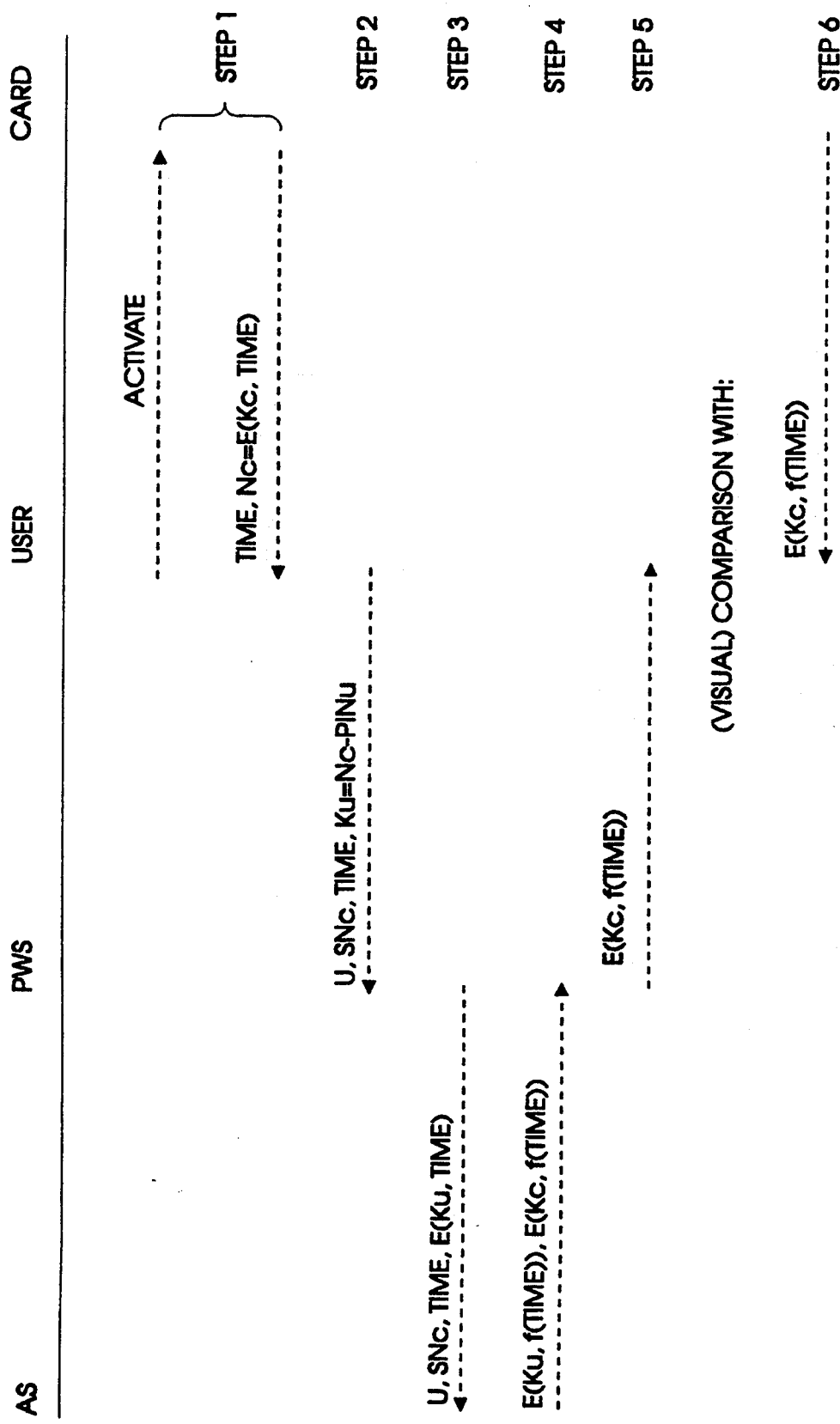
FIG. 3 illustrates the method according to the invention in a time diagram.

The protocol implementing the method according to the invention consists of the following steps which are depicted in FIG. 3.

STEP 1

User 1 begins by activating or turning on smartcard 2 using sequence button 5 (FIG. 2) on the card. The card immediately computes and displays, either sequentially or simultaneously, two values to the user:

TIME, which is the current time.

$Nc=E(Kc,TIME)$, i.e. an encryption of the current time under $Kc$, the secret key of the card. Throughout the rest of this section this value is referred to as $Nc$. Although time is predictable or easily guessed, its encryption under a strong secret key is random and unpredictable. Furthermore, as a clock doesn't run backwards, $Nc$ is guaranteed to be unique. Hence, $Nc$ can be considered a "strong" nonce.

STEP 2

The user supplies the following values to the work station:

U: User name; and $SNc$: Serial number of the card;

TIME: Current time taken from the card's display;

Ku: user's authenticator, preferably computed as: $Ku=Nc-PINu$, where $PINu$ is the user's PIN. The main assumption in this step is that it is fairly easy for the user to compute the difference between $Nc$ and $PINu$. Moreover, it is not necessarily an arithmetic difference that the user has to compute. For each digit of $Nc$ it suffices to enter the difference between that particular digit and the corresponding digit of the PIN. Ku is a one-time credential that delegates the identity of the user to the work station without disclosing the PIN to the work station. The work station can use Ku to act on behalf of the user beyond the user's authentication session, for instance, as a key encryption key to get pair-wise keys from AS 4 to communicate with other systems. The validity of Ku is limited in time, because it is computed as a secret function of the current time value. The lifetime of Ku can be defined as (TIME+-lifetime) or included as an explicit value in the expression of Ku.

STEP 3

Now work station 3 sends to AS 4:

U, $SNc$, TIME: All unmodified from previous step 2.

$Kp=E(Ku,TIME)$ : Encryption of TIME under Ku. Here, it is assumed that Ku forms a valid encryption key. By sending this value, work station 3 proves to AS 4 that it was granted a valid one-time credential by user 1, i.e. Ku, without disclosing the value of the latter.

The AS uses the received $SNc$ and $Kas$ to compute a potential $Kc$, named $Kc'$. Next, it computes a potential $Nc'=E(Kc',TIME)$, using the TIME received from work station 3. Using U, AS looks up a potential personal identifier $PINu'$ and obtains a potential user authenticator $Ku'=Nc'-PINu'$.

Then, the AS recomputes a potential encryption $Np'=E(Ku',TIME)$ and compares it with its counterpart Np supplied by the work station in previous step 2.

If there is a match AS 4 replies to work station 3 with an accept signal.

The above steps 1 through 3 define the core of the invention. The reply by AS 4 to public work station 3 may have different forms. A preferred example is given below, including steps 4 through 6.

STEP 4

AS 4 replies to work station 3 with:

E(Ku,f(TIME)) : Encryption of f(TIME) under Ku whereby the function f is a simple arithmetic function, e.g., one's complement.

E(Kc,f(TIME)) : Encryption of f(TIME) under Kc.

In this step, AS 4 is simultaneously assured of the freshness and the authenticity of the message it received. The authentication of both the smartcard and the user is attained by recomputing E(Ku,TIME). This is because Ku is uniquely dependent on SNc, Nc and PINu. Freshness is confirmed as a part of the same sequence of checks since Nc depends on a particular TIME value. Furthermore, the clear text TIME field can be validated before any other checks are made. (One may recall that loose time synchronization between smartcards 2 and authorization servers 4 is assumed, i.e. there is a maximum time skew.)

STEP 5

The work station optionally verifies E(Ku,f(TIME)) and displays E(Kc,f(TIME)) on the screen. This step assures the work station that someone, presumably AS 4, possesses Ku.

STEP 6

In order to perform his own verification of AS 4, the user pushes the smartcard's sequence button 5 and reads the authentication value expected from the AS, E(Kc,f(TIME)), on smartcard display 6 and performs a visual comparison of this value with the corresponding value sent by AS 4 and displayed by work station 3, (cf. previous step).

If the two values match, the authentication is completed. The goal of this comparison is to assure user 1 that he/she has, in fact, been communicating with AS 4, since no one but AS 4 and smartcard 2 at hand can compute E(Kc,f(TIME)).

It is important to clarify the meaning of the last step. Most (if not all) existing smartcard-based authentication protocols only provide for the authentication user-to-AS, but not AS-to-user. The protocol above provides for bidirectional authentication. However, if AS-to-user authentication is not desired, user 1 is free to forego the last step entirely.

Finally, user 1 may turn smartcard 2 off by pushing sequence button 5 the last time for this session.

The whole protocol is illustrated pictorially in FIG. 3.

USABILITY CONCERNS

The main usability concern in the above scheme has to do with the interaction complexity of the authentication protocol, i.e., the number of operations imposed on the human user. These operations include:

Entering SNc and TIME into the work station.

Composing Ku from PIN and Nc and entering Ku into the work station.

(Optional) visual comparison of E(Kc,f(TIME)) displayed by the work station and its counterpart displayed by the smartcard.

Of these three operations, only the first two are labor-intensive; the third is strictly optional. In the first operation, SNc is read directly from the smartcard as a decimal number of, say, 10 digits. The time can also be entered directly as a decimal number (e.g., 12:35.02). Alternatively, the work station can be programmed to display its own time (which is assumed to be fairly close to the time kept by the smartcard) and the user can modify the displayed value to match the one shown by the smartcard.

The heaviest burden placed on the human user is the composition of Ku. In the remainder of this section, the techniques for easing this task will be discussed.

In the protocol description above, Nc is assumed to be an 8-byte number that can be represented by 20 decimal digits. Assuming that the PIN is a 6-digit decimal number, the user can obtain Ku in two alternative ways. (Of course, there are many other variations possible as well.)

The user subtracts digit-by-digit his PIN from the first six digits of Nc. For example, the first six digits of Nc can be displayed highlighted in order to ease visual operations. Ku is then entered by the user to the work station as the six decimal digits resulting from the subtraction followed by the fourteen remaining digits of Nc. FIG. 4 gives an example for composing Ku in that way. Of course, this method requires the ability to perform subtraction of six decimal digits digit-by-digit (modulo 10). Part A of Ku in FIG. 4 is obtained from the first six digits of Nc; part B of Ku is simply copied as the last fourteen digits of Nc.

There may be reasons one may want to avoid even such a simple subtraction of two single-digit numbers. In that case, the goal is to prevent a user from writing things down on a piece of paper or using a work station-provided calculator.

One simple solution to this problem is to have each work station display on its screen (or attached to it physically) a simple 10-by-10 table of single-digit decimal numbers and their differences (e.g. row 9, column 6 will display 3) .

Alternatively, as shown in FIG. 5, the display area of the smartcard can be labelled so that each digit of Nc is associated with a fixed number (index) carved on the plastic or printed on the LCD. The first ten digits of Nc are thus numbered from 0 to 9. Using each digit of his PIN as an index, the user reads the Nc digit displayed below the label corresponding to the value of the PIN digit. Each PIN digit thus points to an Nc digit that is entered to the work station to form the first six digits of Ku. The remaining ten digits of Ku are copied directly as the last ten digits of Nc. In FIG. 5, part C of Ku is obtained from the first ten digits of Nc and part D of Ku is copied as the last ten digits of Nc. The advantage of this scheme is that no arithmetic is required from the user.

The resulting Ku is only sixteen digits which reduces its width to 56 bits, from Nc's 64 bits. However, the Data Encryption Standard (DES) specifies 56-bit encryption keys

ANALYSIS

In this section, the protocol presented above shall be analyzed. The following assumptions are made:

Every smartcard's secret, Kc, is a strong key. The derivation of Kc from Kas can be designed to be as strong as required by a particular application because there is no limit on the complexity of this operation that is performed only by the AS as opposed to other operations that are also performed by the smartcard.

The smartcard is trusted to faithfully display appropriate values.

It is difficult to subvert the smartcard's hardware and obtain the secret (Kc) or otherwise manipulate the card, e.g. set back the clock.

The smartcard clock or other running value device is assumed to be monotonous increasing.

The smartcard can be stolen.

Any public work station can be taken over by a hostile party. All communication involving a work station is subject to interception and divulgement and the work station may contain trojan horse programs that disclose all the information entered by the user into the work station or sent by the AS.

A bona fide registered user may turn malicious—his purpose may be to discover other users'secrets, e.g. by letting them use his smartcard.

The main purpose of this analysis is show that the protocol achieves three goals. Goal one is that the AS believes that it is talking to a particular user U at a particular time T through a particular smartcard C. More formally, this can be stated as follows. AS believes that U recently generated Ku using C. Applying the above assumption that only U and the AS know PINu and no two smartcards share the same key, only C can generate Nc=E(Kc,T) and, hence, only U can compute Ku=Nc−PINu.

Goal two is that the user U believes that he/she is talking to AS at time T. Again, more formally, this can be stated as follows. U believes that AS recently generated E(Kc,f(T)). Assuming that f is one-to-one, e.g. one's complement, f(T) does not form a valid time stamp. Therefore, E(Kc,f(T)) could not have been generated by C in the past. Using the assumption that only the AS and C know Kc, U is assured that AS's communication is authentic and timely.

There is, however, a small caveat. Since the smartcard has no knowledge of its immediate user, its challenge value, E(Kc,f(T)), can not be dependent on the user; neither can the AS's response to that challenge. Therefore, if two well-meaning (and even mutually trusting) users decide to save time by activating the smartcard only once for both log-ins, the second part of the message returned by the AS (E(Kc,f(T))) will be identical in both cases. This implies that a malicious work station can mislead one of the two users into believing that he/she is talking to the AS.

The third important goal is that PINu should not be discoverable by an intruder. The user enters PINu indirectly in step 2 of the protocol. Since Ku is the only value dependent on the PIN in the entire protocol, the only venue for obtaining the PIN is from Ku. This is reasonable, since one of the assumptions is that a work station may turn malicious and try to misuse Ku. However, in order to extract the PIN from Ku, the knowledge of Nc is required; one may recall that Ku=Nc−PINu. But, Nc is known only to the AS, the smartcard, and the user.

One of the principal assumptions is that the smartcard clock never runs backward. It guarantees that Nc are never "recycled", i.e. every Nc is unique and unpredictable. Therefore, although a work station may accumulate a number of Ku values for the same user or many different users, it is not able to extract a single PIN, since in all Ku values, a PIN is masked by a nonce.

The case of a shared smartcard must also be considered. If two users, A and B, share the same smartcard, the issue is whether it is possible for one of them, say A, to discover the other's, say B's, PIN. It is fair to assume that user A could subvert a public work station and discover B's Ku. Then, in order to extract user B's PIN, user A will need to obtain the same Nc as was used to compute B's Ku. A cannot obtain it by manipulating the smartcard after the fact since Nc values are time-dependent. Hence, the only viable method of attack is to look over the shoulder and record Nc the "hard way". However, this is an issue in any method, e.g. also in current non-smartcard techniques.

While the invention has been shown and described with reference to a preferred embodiment, variations and modifications can be made without departing from the spirit and scope of the invention as laid down in the following claims.

We claim:

1. A method for authenticating a user with a smartcard to a system including an authentication server and a plurality of distributed work stations connected to said server, said smartcard having a unique card identifier and including a running value device, input-output means, and encrypting means with a secret card key, said server having stored user names, user personal identifiers, at least one secret key, and card identifiers, said method comprising the following steps:

(1) indicating with a smartcard a card running value and computing with the smartcard a first encryption of the card running value under a the secret card key;

(2) receiving at a work station a user name, a card identifier, the card running value, and a user authenticator computed from a user's personal identifier and the first encryption;

(3) transmitting from the work station to the server the user name, the card running value, the card identifier, and a second encryption of the card running value under the user authenticator;

(4) determining with the server a potential secret card key from the received card identifier and a potential personal identifier from the received user name;

(5) computing with the server a first potential encryption of the received card running value under the potential secret card key, and, combining the potential personal identifier and the computed first potential encryption to obtain a potential user authenticator;

(6) computing with the server a second potential encryption of the received card running value under the potential user authenticator, and comparing the second potential encryption to the received second encryption; and (7) determining if the second potential encryption matches the received second encryption, and transmitting an accept signal from the server to the work station if a match is determined.

2. The method according to claim 1, further comprising deriving the secret card key of the smartcard from the card identifier by encrypting the card identifier with a server secret key, storing at the server user names, user personal identifiers, and said server secret key, and determining at the server the potential secret card key from the received card identifier and the server secret key.

3. The method according to claim 1, wherein the smartcard data resulting from said indicating step (1) is electrically entered into the work station.

4. The method according to claim 1, wherein the smartcard data resulting from said indicating step (1) is optically entered into the work station.

5. The method according to claim 1, wherein the smartcard data resulting from said indicating step (1) is manually entered into the work station.

6. The method according to claim 1, wherein the smartcard must be activated to indicate a running value.

7. The method according to claim 1, further comprising validating with the server the received card running value, comparing the received card running value to the server's internal running value, and, if the difference exceeds a predetermined size, discontinuing processing.

8. The method according to claim 1, further comprising validating with the server the received card running value, comparing the received card running value to the server's internal running value, and, if the difference exceeds a predetermined size, transmitting a message to the work station.

9. The method according to claim 1, further comprising that if a match of the second potential encryption with the received second encryption is determined, computing with the server a third encryption of a function of the received running value under the received user authenticator, and transmitting the third encryption to the work station.

10. The method according to claim 9, further comprising the step of displaying to the user the third encryption value transmitted by the server to the work station.

11. The method according to claim 1, further comprising that if a match of the second potential encryption with the received second encryption is determined, computing with the server a third encryption of a function of the received running value under the secret card key, and transmitting the third encryption to the work station.

12. The method according to claim 11, further comprising the step of displaying to the user the third encryption value transmitted by the server to the work station.

13. A system for authenticating a user with a smartcard, said system including authentication server means and a plurality of distributed work stations connected to said server means, comprising:
said smartcard having
a card identifier,
a running value device for indicating a card running value,
input-output means, and
encrypting means with a secret card key for computing a first encryption of the indicated card running value under the secret card key,
each said work station having
input means for receiving the user name the card identifier, the card running value, and a user authenticator computed from the user's personal identifier and the first encryption,
means for encrypting the card running value under the user authenticator,
means connectable to said server for transmitting to the server the user name, the card running value, the card identifier, and a second encryption of the card running value under the user authenticator,
said server means having
at least one memory storing user names, user personal identifiers, at least one secret key, and preferably, card identifiers,
means for determining a potential secret card key from the received card identifier and a potential personal identifier from the received user name,
means for computing a first potential encryption of the received card running value under the potential secret card key,
means for obtaining a potential user authenticator from the potential personal identifier and the computed first potential encryption,
means for computing a second potential encryption of the received card running value under the potential user authenticator,
means for comparing the second potential encryption with the received second encryption,
means for transmitting a signal to the work station, which is an accept signal if the second potential encryption matches the received second encryption, and which is a non-accept signal otherwise.

14. The system of claim 13, wherein the running value device in the smartcard is a continuously running clock.

15. A method for authenticating a user with a smartcard to a system including an authentication server and at least one distributed work station connected to said server, said smartcard having a unique card identifier and including means for generating a running value, input-output means, and encrypting means with a secret card key, said server having stored user names, user personal identifiers, at least one secret key, and card identifiers, said method comprising the following steps:

(1) generating a card running value with the running value generating means and computing with the smartcard a first encryption of the card running value under a secret card key;

(2) receiving at a work station a user name, a card identifier, the card running value, and a user authenticator computed from a user's personal identifier and the first encryption;

(3) transmitting from the work station to the server the user name, the card running value, the card identifier, and a second encryption of the card running value under the user authenticator;

(4) determining a potential secret card key from the received card identifier and a potential personal identifier from the received user name;

(5) computing a first potential encryption of the received card running value under the potential secret card key, and, combining the potential personal identifier and the computed first potential encryption to obtain a potential user authenticator;

(6) computing a second potential encryption of the received card running value under the potential user authenticator, and comparing the second potential encryption to the received second encryption; and (7) determining if the second potential encryption matches the received second encryption, and transmitting an accept signal from the server to the work station if a match is determined.

16. The method according to claim 15, wherein steps 4, 5, and 6 are performed at the server.

17. The method according to claim 15, wherein steps 4, 5, and 6 are performed at a station within a computerized system.

18. A system for authenticating a user with a smartcard to an authentication server and a plurality of distributed work stations connected to said server, comprising:
  (1) means for indicating with a smartcard a card running value and computing with the smartcard a first encryption of the card running value under a secret card key;
  (2) means for receiving at a work station a user name, a card identifier, the card running value, and a user authenticator computed from a user's personal identifier and the first encryption;
  (3) means for transmitting from the work station to the server a user name, the card running value, the card identifier, and a second encryption of the card running value under the user authenticator;
  (4) means for determining with the server a potential secret card key from the received card identifier and a potential personal identifier from the received user name;
  (5) means for computing with the server a first potential encryption of the received card running value under the potential secret card key, and, combining the potential personal identifier and the computed first potential encryption to obtain a potential user authenticator;
  (6) means for computing with the server a second potential encryption of the received card running value under the potential user authenticator, and comparing the second potential encryption to the received second encryption; and
  (7) means for determining if the second potential encryption matches the received second encryption, and transmitting an accept signal from the server to the work station if a match is determined.

19. The system according to claim 18, wherein the smartcard comprises:
  means for associating a unique card identifier with the smartcard,
  means for generating a running value,
  input-output means, and
  encryption means connectable to said running value generating means.

20. The smartcard of claim 19, further comprising:
  (1) means for activating input to the smartcard, and
  (2) means for displaying output of the smartcard.

21. The smartcard of claim 19, further comprising data transfer means for communicating the card data to an external device.

* * * * *

UNITED STATES PATENT AND TRADEMARK OFFICE
CERTIFICATE OF CORRECTION

PATENT NO. : 5,347,580
DATED : September 13, 1994
INVENTOR(S) : Refik A. Molva et al It is certified that error appears in the above-identified patent and that said Letters Patent is hereby corrected as shown below:

On title page, item [75] correct the inventors addresses to read as follows:

Refik A. Molva, Juan-Les-Pins, France;

Gene Tsudik, Thalwil, Switzerland

In Column 11, line 18, replace "users'secrets" with --users' secrets--.

In Column 12, line 32, delete the word "a".

In Column 13, line 58, replace "name" with --name,--.

In Column 13, line 64, replace "means" with --means,--.

Signed and Sealed this

Twentieth Day of December, 1994

Attest:

BRUCE LEHMAN

Attesting Officer      Commissioner of Patents and Trademarks